Sept. 27, 1949.　　　　T. G. HIERONYMUS　　　　2,482,773
DETECTION OF EMANATIONS FROM MATERIALS AND
MEASUREMENT OF THE VOLUMES THEREOF
Filed Oct. 23, 1946

INVENTOR.
Thomas G. Hieronymus
BY
ATTORNEY.

Patented Sept. 27, 1949

2,482,773

UNITED STATES PATENT OFFICE 2,482,773

DETECTION OF EMANATIONS FROM MATERIALS AND MEASUREMENT OF THE VOLUMES THEREOF

Thomas G. Hieronymus, Kansas City, Mo.

Application October 23, 1946, Serial No. 705,028

13 Claims. (Cl. 250—83)

This invention relates to the art of detecting the presence of and measuring the intensity or quantity of any of the known electro-chemical series of elements of material matter, or the combination of two or more such elements, whether in solid, fluid or gaseous forms at ordinary room temperatures and without special treatment or requiring any change in the material under observation.

This application is a continuation in part of my co-pending application for Letters Patent Serial Number 555,553, filed September 23, 1944, and now abandoned and pertaining to improvements in Detection of emanations from materials and volumes thereof.

The primary aim of this invention is the provision of a method and apparatus for detecting the presence of any element or combination of elements that may be in the substances under observation and to determine the intensity or quantity thereof.

This invention has for a still further object to provide a method and means for detecting the presence of and analyzing and measuring the quantity or intensity of elements or combination of elements in the substance under observation through the capture and analysis of radiations emanating from the said elements, whether the said radiations be of electrical or optical characteristics, or both.

A yet further aim of this invention is to provide an instrument having a reaction device, the surface whereof is affected by the introduction of radiations thereto, in such a manner that the surface of the device will have its ability to resist movement of articles over its face changed when energy flows through the apparatus, of which the reaction device is a part.

A further aim of the invention is to provide an atomic radiation analyzer, having as one of its important elements, a reaction device, the surface whereof is affected to increase adhesion or friction as the operator of the analyzer strokes the surface of the device and manipulates the instrument to direct radiation thereto.

It has been discovered that there are radiations emanating from or released from each of the known elements constituting material matter. These emanations occur at ordinary room temperatures, i. e. 40° F. to 90° F. and they have electrical and optical characteristics and frequencies which are disposed in the zone from the violet ray portion of the visible spectrum up into the ultra-violet portion, which zone has as yet not been fully explored. Since it has been found that these radiations from the elements or their effect may be carried over electrical conductors, it is the object of this invention to provide apparatus having suitable conductors and parts so that analyzing of substances may be accomplished. The radiations or the effect of such radiations from known elements or combinations of two or more elements of material matter may not only be carried over electrical conductors and handled in a manner similar to an ordinary electrical current, but they may be affected by electrical capacity inductance and resistance. The radiations may also be refracted, focussed, diffracted or otherwise manipulated in the same manner as the radiations of the visible spectrum. Accordingly, therefore, this invention has for one of its aims to provide an instrument for handling the radiations, identifying their presence, analyzing them and measuring their intensity—all to the end that the presence of one or more of the known elements may be concluded from the character of the radiation as determined by the behavior of the analyzing device and the values read from the appropriate scales forming a part of the instrument.

Other objects of the invention will appear during the course of the following specification, referring to the accompanying drawing, wherein.

Figure 1:
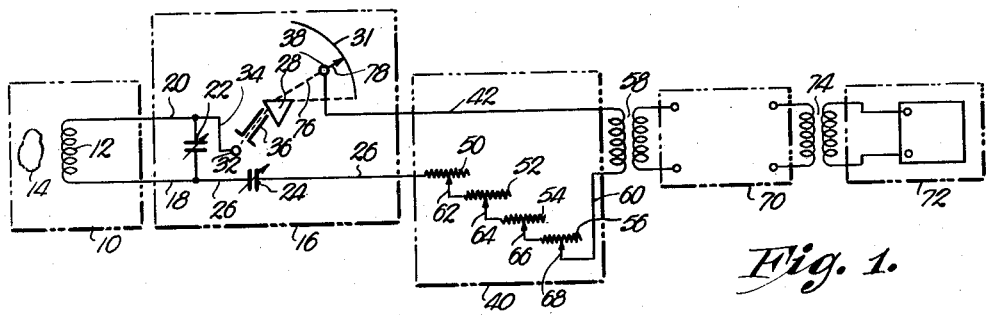
Fig. 1 is a schematical and diagrammatical view illustrating an instrument for detection of emanations from materials and measuring the volumes thereof, made in accordance with the present invention.

Prior to referring specifically to the parts of the apparatus diagrammatically illustrated in the drawing, clarification of the theory upon which the invention is predicated will be made by explaining experiments heretofore conducted and capable of proving the phenomenal theories hereinafter disclosed as having a bearing upon the practicability and utility of both the electrical and optical apparatus.

Radiations from each of the known elements of matter produce some form of energy, probably electrons which can be made to flow along electrical conductors. The flow from each of the elements having characteristics different from the others. Conversely, the flow of electrons along a conductor produces a radiation having characteristics of the radiation from each respective element. Such of the known elements as are required to feed growing plants have been transmitted to the plants through metallic conductors as the plants were entirely isolated from the elements upon which they were fed. More precisely, seeds were planted in boxes in a darkened basement room. One of the boxes of plants containing some of the seeds was used as a control and no apparatus for transmitting element radiations thereto provided. The remaining boxes of plants had electrodes or plates of conducting material mounted or otherwise disposed adjacent thereto, and each box of plants was separately attached to a conductor extending to a point outside the building where electrodes or plates were attached to the conductors and allowed to remain exposed to the light. Such of the known elements as required to impart normal characteristics to the plants were apparently fed thereto by having the radiations of the elements from the light conducted to the plants through the wires and associated electrodes. The treated plants were relatively healthy but the control plant assumed the characteristics of growing vegetation which has been deprived of the elements in natural light. Particularly was the control plant devoid of chlorophyl while the remaining plants were green.

Apparatus for laboratory or commercial use and for detecting the presence of any of the known elements, preferably relies upon the element of touch, and therefore, the skill of the operator. The instrument diagrammatically illustrated in Fig. 1 comprises a unit 10 including a coil 12 disposed to pick up radiation from substance 14, wherein the known elements are disposed and that are to be detected. The temperature of substance 14 may be within the range of from 40 to 90° F. but such temperature is not critical. This range has been found satisfactory in actual practice.

Coil 12 may be a spirally wound flat body approximately 2 in. in diameter and formed of magnet insulated wire of any conventional size. As an alternative, this coil 12 may be a single layer, cylindrical coil, wound on a core of insulating material substantially 1 in. in diameter. The examples given for this coil 12 are not critical and so long as the coil is in the field of radiation of substance 14, the purpose of unit 10 will be fulfilled.

Instead of employing coil 12, wire 20 may be directly connected to substance 14 or wire 20 may be terminated in an electrode and the latter disposed with relation to substance 14 as to pick up the radiations therefrom, as does coil 12 in the illustrated embodiment. In this case, wire 18 may be grounded or connected separately to substance 14 or terminated in another electrode which may also be placed near substance 14. The proximity of substance 14 to coil 12 or the electrodes as the case may be, is such as to be within the field of radiation of the emanations from substance 14.

Figure 2:
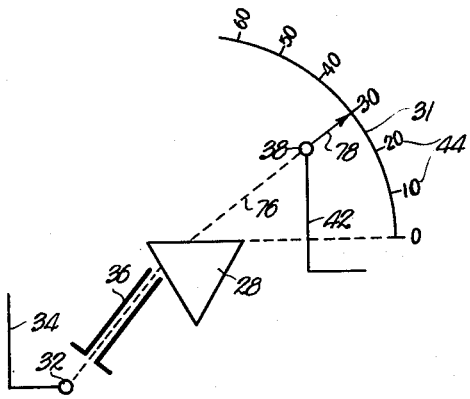
Fig. 2 is an enlarged detailed fragmentary schematic view illustrating a portion of the instrument shown in Fig. 1.
Figure 3:
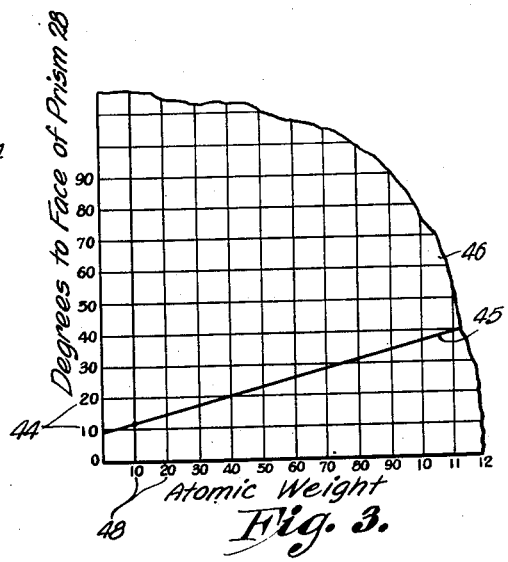
Fig. 3 is a fragmentary elevational view of a chart, usable in connection with the instrument, to translate the scale readings into identification of the substances.

Apparatus 16 is a manually manipulatable analyzer tuneable to the specific radiation desired. It consists of two principal parts, the first being the two standard type of variable condensers, 22 and 24, and the second being the ray refracting device made up of electrode 32—passageway 36, prism 28 and electrode 38, all as shown in Fig. 2. Apparatus 16 is joined to unit 10 by conductors 18 and 20 across which is disposed a conventional variable condenser 22 and with which is employed a condenser of similar type 24, located in conductor 26, as illustrated. Variable condensers 22 and 24 may be of standard radio-broadcast type and they are provided with graduated scales in conventional manner.

Prism 28 is of any suitable ray refracting substance as glass, quartz or analogous materials. In practice a prism 28 having two polished faces disposed at angles from 30 to 60 degrees has proved satisfactory. An electrode 32 is joined to coil 12 by conductor 20 and conductor 34. Stationary electrode 32 may be of any electrical conducting material such as aluminum, brass, copper or substances having analogous electrical properties. The distance of electrode 32 from prism 28 is not critical so long as the radiations or emanations reach prism 28 through a confined path of travel in the nature of a thin band or line. In practice, this distance was from one-half to two inches. A passageway 36 formed between a pair of optically opaque insulating elements directs the radiations to a desired area on one face of prism 28.

The angle of incidence of this path of travel to the face of the prism 28 was of the order of 5.5° for best results and for obtaining the widest useful segment along scale 31.

An electrode 38 shiftable along scale 31 is joined to unit 40 by conductor 42. Electrode 38 is of the same specifications as to materials and distance from prism 28 as electrode 32 but is suitably mounted for movement adjacent to scale 31 where its position may readily be indicated by a pointer 78 movable therewith and extending outwardly therefrom toward scale 31 in alignment with the path of travel of the thin ray of energy indicated by the line 76. The axis of rotation of electrode 38 is substantially on a median line extending longitudinally across the face of prism 28 proximal to electrode 38. Electrodes 32 and 38 work best when they are relatively thin and of the order of a few mils thickness.

As illustrated in Fig. 2, scale 31 is calibrated with indicia 44, and these indicia are on chart 46 along one edge thereof. The indicia on chart 46 have been given a corresponding reference numeral to those on scale 31 for clarifying the description hereinafter set down. Indicia 48 on chart 46 designate the atomic weight of elements of matter and continue up to include all known elements of the electro-chemical series when the full size chart is employed.

Unit 40 is a variable resistance. It may be either a continuously variable type or it may consist of a series of non-inductive resistance units 50, 52, 54, and 56 are each adjusted by a switch having movable points 62, 64, 66 and 68 respectively.

In practice, unit 50 will have ten times the resistance of unit 52, which in turn is ten times the size of unit 54, etc. (the values may range from fractions of 1 ohm up to several megohms). Unit 50 e. g. might be 1 megohm in steps of 100,000 ohms each; unit 52 then would be 100,000 ohms total in steps of 10,000 ohms each; unit 54 then would be 10,000 ohms total in steps of 1,000 ohms each, and so on until the smallest unit would have steps low enough to give the desired exactness to the measured volume or intensity of the radiations.

Unit 40 is joined to unit 70 by means of an untuned radio frequency type transformer 58 through the medium of conductors 42 and 60. Unit 40 may be joined to unit 70 by resistance coupling or other conventional coupling of the type frequently used in standard broadcast radio receivers and which is analogous to transformer 58.

Unit 70 may be a conventional three stage tuned radio frequency broadcast band-type of amplifier with the usual variable condensers omitted or it may be of the resistance coupled or impedance coupled type often used in radio broadcast type amplifiers. Said amplifier intensifies the value of the radiations reaching it so that the effect upon detector 72 is clearly discernable. Under some conditions, the reactions from unit 40 may be put directly into detector 72 without interposing unit 70 but amplification of the radiations is desirable.

Detector 72 is a device that will indicate a change from its normal state when the radiations from the analyzer 16 are caused to influence it.

Detector 72 may be connected to unit 70 by transformer 74 or it may be placed near enough to pick up the radiations from the output of unit 70 without direct contact so long as it is placed within the field of radiations.

Detector 72 is preferably an electrical conductor coated with a material having such characteristics that under influence of energy flowing through the conducting portion, the coating will change its surface tension or viscosity, or in some manner give evidence of the presence of the energy flowing through the conducting portion by producing a greater drag or resistance to the movement of any part of the body of the operator thereover, such as the hand or fingers. It has been found practical to use a metal plate covered with a sheet of plastic or coated with lacquer, which plate is of an area convenient for stroking with the tips of the fingers or palm of the hand. It may also be a sheet or plastic with a coil similar to coil 12 disposed adjacent thereto and connected to the coupling transformer 74.

Figure 4:
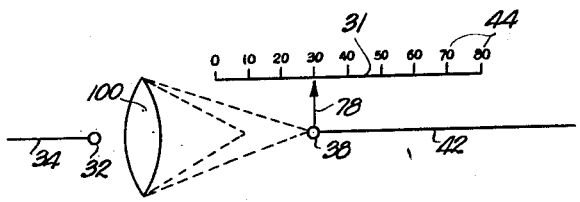
Fig. 4 is a diagrammatical view illustrating another type of radiation refracting member, capable of forming a part of the instrument illustrated in Fig. 1.

Fig. 4 illustrates another form of that part of unit 16, showing Fig. 2, so far as the element separator or filter portion thereof is concerned. This separation or filtering is accomplished in the embodiment illustrated in Fig. 1 and Fig. 2 by prism 28. In Fig. 4 a lens 100 has the electrode 32 disposed adjacent thereto and movable electrode 38 is shiftable toward and from lens 100.

Scale indicia 44 are disposed in a line parallel to the path of travel of electrode 38 and the element or elements involved will be determined by the location or the scale of pointer 78 at the instant a reaction is obtained at detector 72.

Chart 46 is of course produced as a part of the complete apparatus when such apparatus is manufactured and after the prism 28 (or lens 100, as the case may be) is installed as a unit of the material detector. A small quantity of each of the known chemical elements is placed adjacent to coil 12 and with full knowledge of the element, the angle of radiation formed by line 76 and, the face of the prism 28, is determined and the degree numeral on scale 31, which identifies the angle of the radiation, is placed on chart 46 as one of the indicia 44. After this chart 46 is so constructed and the intersecting lines are extended from indica 44 (degree readings from scale 31) and indicia 48 (the atomic weight of the known elements) then when the apparatus is in practical use, any material or substance may be located adjacent to coil 12 and its components definitely determined by positioning electrode 38 on a line of radiation 76 where the degree number on the face of scale 31 is quickly read and used by referring to chart 46. When the degree indicia 44 is so located, the line on chart 46 extending therefrom is followed until it reaches the diagonal line 45 on chart 46 whereupon the operator then follows the intersecting line to the lower edge of the chart where the value of the atomic weight 48 is read. These atomic weights are well known and are used in conventional texts and scientific works.

In practice, for example, let it be assumed that substance 14 contains calcium but it is not known that such is the case. The angle at which the unknown ray or radiation leaves prism 28 will teach its name for, as the operator moves the fingers over the surface of detector 72, electrode 38 is shifted slowly and pointer 78 moves along scale 31 until a greater degree of adhesion or resistance to motion at the surface of detector 72 is set up. This occurs when the energy or radiation flows from unit 16 through units 40 and 70 into detector 72. When electrode 38 is at a position where it is intercepting a radiation from prism 28, or lense 100, the resistance to stroke at detector 72 will be of highest order.

As soon as electrode 38 has been positioned as described, variable condenser 22 is adjusted while the operator continues to stroke detector 72 to a position where the greatest drag at detector 72 is again manifested. Next, variable condenser 24 is similarly manipulated to obtain a setting where the drag at detector 72 again reaches a maximum. Electrode 38 is then readjusted for a final position. The employment of condensers 22 and 24 insure a more accurate setting of pointer 78 by virtue of their additional filtering action.

In the illustration, electrode 38 has intercepted the path of radiation with pointer 78 at the numeral 30 on scale 31 and reference to chart 46 will teach the operator that the element having atomic weight 79.2 is that from which the radiation along dotted line 76 is travelling. If atomic weight 79.2 is calcium then that element in substance 14 has been located.

The manner of using lens 100 is substantially the same as described in connection with the use of prism 28. The focal point of paths of radiation of the elements will cause detector 72 to react and establish a drag to the operator's touch, whereupon the scale 31 may be read and its reading translated by reference to chart 46.

What actually happens at detector 72 to increase and decrease its drag to the touch of the operator, is not known but the apparatus functions as above set forth when constructed as specified, and therefore, a positively acting analyzer for atomic radiations is produced even though the principle upon which it is based is not fully known.

Radiation from hydrogen passes through prism 28 at the sharpest angle or at the lowest degree measured from the face of prism 28. Radiations from other elements and their isotopes pass through prism 28 at greater angles but in the same order as their atomic weight—the heavier the element or its isotope, the wider the angle.

A substance composed of two or more of the known elements may be analyzed as herein set down to determine its component constituents. The substance itself which consist of two or more known elements may be identified because the emanations therefrom will produce a composite frequency peculiar to that combination of elements. All combinations may be charted in precisely the same manner as herein described for all the individual known elements in the electro chemical series.

Unit 40 is used to measure the intensity of the radiations from a given element or substance by adjusting the several switches comprising unit 40 until the maximum amount of resistance has been introduced into the circuit without interrupting the reactions manifested at detector 72. The switches are calibrated in conventional resistance values and a chart must be prepared that will relate the value indicating by switch settings of unit 40 the quantative units of measurement.

It is realized that apparatus for detecting materials and measuring the volumes thereof, having physical characteristics different from those illustrated and described, might be made without department from the spirit of the invention or scope of the appended claims.

Having thus described the invention, what is claimed as new and desired to be secured by Letters Patent is:

1. The method of analyzing substance to detect the presence of any of the known elements contained therein, which comprises capturing only the radiations emanating from one of the elements, having both electrical and optical characteristics; and identifying the said radiations to accomplish the desired purpose.

2. The method of analyzing substance to detect the presence of any of the known elements contained therein, which comprises capturing only the radiations emanating from one of the elements having both electrical and optical characteristics; identifying the said radiations to accomplish the desired purpose; and measuring the quantity of said radiations.

3. The method of analyzing a substance containing a plurality of chemical elements to determine the component elements of said substance which comprises capturing the radiations emanating from the substance having both electrical and optical characteristics; and identifying the radiations to accomplish the desired purpose.

4. The method of detecting the presence of chemical elements in a specimen under test by capturing and analyzing the electrical and optical radiations characteristic of such elements emanating from said specimen which comprises, impressing said radiations on an electrical conductor; conducting the radiations through a tunable circuit including said electrical conductor to an electrode in said circuit from which electrode said radiations emanate; directing the radiations emanating from said electrode through a refracting body; adjusting a second electrode until it intercepts said refracted radiations; conducting said radiations from said second named electrode to a detector comprising a conductive solid having a smooth planar surface to vary the surface frictional characteristics of said solid; tuning said tunable circuit until a maximum of the radiations from said specimen are emitted from said first named electrode; and readjusting said second named electrode until the variation of the surface characteristice of said detector indicates that a maximum of refracted radiations are impressed on said second named electrode.

5. The method of detecting the presence of chemical elements in a specimen under test by capturing and analyzing the electrical and optical radiations characteristic of such elements emanating from said specimen which comprises, impressing radiations on an electrical conductor; conducting the radiations through a tunable circuit including said electrical conductor to an electrode in said circuit from which electrode said radiations emanate; directing the radiations emanating from said electrode through a refracting body; adjusting a second electrode until it intercepts said refracted radiations; amplifying the radiations intercepted by said second named electrode; conducting said amplified radiations to a detector coupled with said amplifier which detector comprises a conductive solid having a smooth planar surface to vary the surface frictional characteristice of said solid; tuning said tunable circuit until a maximum of the radiations from said specimen are emitted from said first named electrode; and readjusting said second named electrode until the variations of the surface frictional characteristics of said detector indicates that a maximum of refracted radiations are impressed on said second named electrode to obtain an indication of the presence of a chemical element in said specimen.

6. The method of detecting the presence and quantity of chemical elements in a specimen under test by capturing and analyzing the electrical and optical radiations characteristic of such elements emanating from said specimen which comprises, impressing said radiations on an electrical conductor; conducting the radiations through a tunable circuit including said electrical conductor to an electrode in said circuit from which electrode said radiations emanate; directing the radiations emanating from said electrode through a refracting body; adjusting a second electrode until it intercepts said refracted radiations; conducting said radiations from said second named electrode through a variable resistance; amplifying the radiations passing through said variable resistance; conducting said amplified radiations to a detector coupled with said amplifier which detector comprises a conductive solid having a smooth planar surface to vary the surface frictional characteristics of said solid; tuning said tunable circuit until a maximum of the radiations from said specimen are emitted from said first named electrode; readjusting said second named electrode until the variations of the surface frictional characteristics of said detector indicates that a maximum of refracted radiations are impressed on said second named electrode to obtain an indication of the presence of a chemical element and varying the resistance in said variable resistance unit until the surface frictional characteristics of said detector are unaffected to obtain an indication of the quantity of said element in said specimen.

7. The method of detecting the presence in any body of a specific element as well as the quantity thereof which comprises, impressing on an electrical conductor radiant waves having optical and electrical properties which are generated by and which are characteristic of a specific element; tuning said waves; impressing the tuned waves on an electrode; amplifying said waves by an amplifying circuit which includes a coupling element, a gap adjacent said last named electrode, and an adjustable electrode, said last two electrodes being at opposite ends of said gap; causing said waves to pass through a refracting body in passage through said gap; impressing said amplified waves on an indicator comprising a conductive solid having a smooth planar surface coupled to said coupling element; adjusting said adjustable electrode and operating said indicator and said adjustable electrode until a maximum intensity of refracted rays is indicated.

8. Apparatus for analyzing substance to detect the presence and quantity of any of the known elements therein comprising, in combination, a pick-up unit having electrical conductive properties for absorbing characteristic radiations of an optical and electrical nature from the substance being analyzed; an electrode in connection with said unit from which the radiations move outwardly along a particular path of travel; a refracting member of transparent material in said path to intersect said radiations; a scale having indicia thereon whereby any one of the elements may be identified; a second electrode between the said member and the scale to collect radiations passing through the member after their path of travel has been altered thereby; and apparatus measuring the quantity of the radiations collected by the second electrode.

9. Apparatus for analyzing substance to detect the presence and quantity of any of the known elements therein comprising, in combination, a pick-up unit having electrical conductive properties for absorbing characteristic radiations of an optical and electrical nature from the substance being analyzed; an electrode in connection with said unit from which the radiations move outwardly along a particular path of travel; a refracting member of transparent material in said path to intersect said radiations; a scale having indicia thereon whereby any one of the elements may be identified; a second electrode between the said member and the scale to collect radiations passing through the member after their path of travel has been altered thereby; apparatus measuring the quantity of the radiations collected by the second electrode; and a detector member conductively joined to the last-mentioned apparatus characterized by the property of having its effect upon the touch altered in accordance with the flow of radiations thereto.

10. Apparatus for analyzing substance to detect the presence and quantity of any of the known elements therein comprising a pick-up unit having electrical conductive properties for collecting characteristic radiations of an optical and electrical nature from the substance being analyzed; an electrode in connection with said pick-up unit from which the radiations move outwardly along a path of travel; a lens in said path of travel to refract radiations emanating from the said electrode and traveling in said path, said lens having a focal point for each known element; a second electrode to collect radiations passing through the lens; and a scale having indicia thereon, provided with reference characters each indicative of one of the known elements and each being at a focal point of said lens.

11. Apparatus for analyzing substance to detect the presence and quantity of any of the known elements therein comprising a pick-up unit having electrical conductive properties for collecting characteristic radiations of an optical and electrical nature from the substance being analyzed; an electrode in connection with said pick-up unit from which the radiations move outwardly along a path of travel; a lens in said path of travel to refract radiations emanating from the said electrode and traveling in said path, said lens having a focal point for each known element; a second electrode to collect radiations passing through the lens; a scale having indicia thereon, provided with reference characters each indicative of one of the known elements and each being at a focal point of said lens; and apparatus for measuring the quantity of the radiations collected by the said second electrode.

12. Apparatus for analyzing substance to detect the presence and quantity of any of the known elements therein comprising a pick-up unit having electrical conductive properties for collecting characteristic radiations of an optical and electrical nature from the substance being analyzed; an electrode in connection with said pick-up unit from which the radiations move outwardly along a path of travel; a lens in said path of travel to refract radiations emanating from the said electrode and traveling in said path, said lens having a focal point for each known element; a second electrode to collect radiations passing through the lens; a scale having indicia thereon, provided with reference characters each indicative of one of the known elements and each being at a focal point of said lens; apparatus for measuring the quantity of the radiations collected by the said second electrode; and a detector member conductively joined to the last-mentioned apparatus charactertized by the property of having its effect upon the touch altered in accordance with the flow of radiations thereto.

13. An apparatus for analyzing a substance to detect the presence of any of the known chemical elements in said substance comprising, an electrical conductor for absorbing the characteristic radiations of an optical and electrical nature from a chemical element in the substance being analyzed; a tuning circuit connected to said electrical conductor; an electrode in said tuning circuit from which said radiations emanate in a defined path of travel; a refracting body adjacent said electrode and positioned in the path of travel of said radiations for refracting said radiations; an adjustable electrode positioned adjacent a portion of said refracting body from which the refracted radiations emanate; a scale provided with indicia for identifying any one of the chemical elements associated with said adjustable electrode; and a detector comprising a conductive solid having a smooth planar surface conductively coupled with said adjustable electrode, said detector being characterized by the property of varying its surface frictional characteristics when a maximum of refracted radiations are conducted thereto.

THOMAS G. HIERONYMUS.

REFERENCES CITED

The following references are of record in the file of this patent:

UNITED STATES PATENTS

| Number | Name | Date |
|---|---|---|
| 2,115,578 | Hall | Apr. 26, 1938 |